(12) United States Patent
Jung et al.

(10) Patent No.: US 9,213,126 B2
(45) Date of Patent: Dec. 15, 2015

(54) POLYESTER RESIN COMPOSITION AND POLYESTER FILM USING THE SAME

(71) Applicant: KOLON INDUSTRIES, INC., Gwancheon-si, Gyeonggi-do (KR)

(72) Inventors: Yuin Jung, Busan (KR); Jiyong Park, Gumi-si (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 0 days.

(21) Appl. No.: 14/347,449

(22) PCT Filed: Sep. 26, 2012

(86) PCT No.: PCT/KR2012/007742
§ 371 (c)(1),
(2) Date: Mar. 26, 2014

(87) PCT Pub. No.: WO2013/048103
PCT Pub. Date: Apr. 4, 2013

(65) Prior Publication Data
US 2014/0288209 A1  Sep. 25, 2014

(30) Foreign Application Priority Data

Sep. 30, 2011 (KR) .................. 10-2011-0099864
Sep. 25, 2012 (KR) .................. 10-2012-0106175

(51) Int. Cl.
*G02B 1/04* (2006.01)
*C08K 5/49* (2006.01)
*C08L 67/02* (2006.01)

(52) U.S. Cl.
CPC ... *G02B 1/04* (2013.01); *C08K 5/49* (2013.01); *C08L 67/02* (2013.01)

(58) Field of Classification Search
CPC ............. C08K 5/49; C08L 67/02; G02B 1/04
USPC ......................... 524/433, 436, 605
See application file for complete search history.

(56) References Cited

U.S. PATENT DOCUMENTS

| | | | |
|---|---|---|---|
| 2004/0058805 | A1 | 3/2004 | Nakajima et al. |
| 2006/0069184 | A1* | 3/2006 | Otto et al. ............... 524/115 |
| 2009/0082529 | A1 | 3/2009 | Kageyama et al. |
| 2009/0315219 | A1 | 12/2009 | Shelby et al. |
| 2010/0178524 | A1* | 7/2010 | Yoshimura et al. ........... 428/480 |
| 2011/0077339 | A1 | 3/2011 | Kim et al. |

FOREIGN PATENT DOCUMENTS

| | | | |
|---|---|---|---|
| CN | 1752139 | A | 3/2006 |
| CN | 101263175 | A | 9/2008 |
| JP | 2598691 | B2 | 4/1997 |
| JP | 2006265324 | A | 10/2006 |
| JP | 2007-169424 | A | 7/2007 |
| JP | 2010018781 | A | 1/2010 |
| JP | 2010285527 | A | 12/2010 |
| KR | 10-2009-0069632 | A | 7/2009 |

OTHER PUBLICATIONS

Machine translation of JP 2010-018781 A, Jan. 28, 2010.*

* cited by examiner

*Primary Examiner* — Vickey Nerangis
(74) *Attorney, Agent, or Firm* — Sughrue Mion, PLLC

(57) ABSTRACT

Provided are a polyester resin composition having less internal defects, by controlling the metal content in a catalyst and the metal content in an electrostatic pinning agent at the time of manufacturing a polyester resin, and a polyester film using the same.

10 Claims, No Drawings ially, an esterification process), to thereby form a BHT-P Complex and a BHT-Metal-P Complex, and form a complex with antimony used as a catalyst. These complexes are left as defects in the PET after manufacturing the resin, and thus become a fatal disadvantage in being used for a high-grade optical film.

POLYESTER RESIN COMPOSITION AND POLYESTER FILM USING THE SAME

CROSS REFERENCE TO RELATED APPLICATIONS

This application is a National Stage of International Application No. PCT/KR2012/007742 filed Sep. 26, 2012, claiming priority based on Korean Patent Application Nos. 10-2011-0099864 filed Sep. 30, 2011 and 10-2012-0106175 filed Sep. 25, 2012 the contents of all of which are incorporated herein by reference in their entirety.

TECHNICAL FIELD

The present invention relates to a polyester resin composition capable of allowing film manufacture while preventing defects due to agglomeration of metal, to thereby manufacture an optical film having low haze, by minimizing contents of metal components used in a metal catalyst and a pinning agent, and a polyester film using the same.

BACKGROUND ART

In general, polyester, particularly, polyethylene terephthalate (hereinafter, referred to as "PET") is used in film, fiber, a container, a bottle, or mechanical and electronic components due to advantages thereof, such as, excellent heat resistance, mechanical strength, transparency, chemical resistance, and the like, and the use and use amount thereof are expanding due to lower cost thereof as compared with other high-performance resins. Particularly, the polyester film that is technologically manufactured presently has been widely used as a base film for a magnetic recording medium, materials for various kinds of packages, and other industrial uses. In recent, the markets thereof are expanding based on an optical film together with the development of various kinds of display electronic products.

The optical films used in the recent display electronic products, for example, a prism sheet, a light diffusing sheet, a base film for a touch panel, and the like, require superior luminance and sharpness, with the technical development, and thus technologies for minimizing an internal defect and surface defect hindering excellent transparency and smoothness are needed.

Here, when the term defects is defined in only the present invention, the internal defect is referred to as a factor that is present inside the PET and it (internal defect) has a different refractive index, thereby inducing reflection and scattering of light, resulting in deteriorating transparency of the PET. The internal defect may be caused from inorganic metals, external particles, particle agglomeration, carbide, and the like. In addition, the surface defect is referred to as scratch, surface roughness, or the like, which is present in a surface of a PET film to thereby induce reflection and scattering of light and cause problems in a subsequent process.

In most polyester resins represented by PET, an antimony compound is used as a main catalyst in a manufacturing process (particularly, a polycondensation process). However, the antimony compound has a disadvantage in that the compound is present as defects inside the PET after manufacturing resins even though the antimony compound is well dissolved in ethylene glycol at a high temperature. In addition, it has been recently found that the antimony compound is harmful to humans, and as a result, it is determined that the use of the antimony compound is much restricted.

In addition, in a film manufacturing process using a general polyester resin, particularly a casting process, high voltage of electricity is applied to the pinning wire to generate strong static electricity (charges), to closely adhere a sheet type of melted polymer resin discharged from a die on a casting drum, thereby preventing vapor from being sucked between the polymer resin and the casting drum and improving a cooling effect. In order to achieve this, as described in Korean Patent Laid-Open Publication No. 10-2009-0069632, the polyester resin for a film includes a pinning additive for generating charges during a manufacturing process, particularly an alkali metal compound or an alkali earth metal compound, and further include a phosphorous compound, as some of the constituent components. Also, in the related art, internal particles by this metal compound and phosphorous compound are precipitated by a polycondensation reaction system, and thus is utilized to improve high-speed drivability or scratch resistance of a proclaim film or the like.

However, the metal compound and the phosphorous compound react with bis-2-hydroxyethyl terephthalate (BHT) generated during a PET polymerization process (particularly, esterification process), to thereby form a BHT-P Complex and a BHT-Metal-P Complex, and form a complex with antimony used as a catalyst. These complexes are left as defects in the PET after manufacturing the resin, and thus become a fatal disadvantage in being used for a high-grade optical film.

RELATED ART DOCUMENTS

Patent Document

Korean Patent Laid-Open Publication No. 10-2009-0069632 (2009.07.01)

DISCLOSURE

Technical Problem

An object of the present invention is to provide a polyester resin composition for an optical film, of which a metal content is controlled to a predetermined range in order to manufacture an optical film having reduced internal defects even without affecting pinning property in a film manufacturing process, and an optical film using the same.

Technical Solution

In one general aspect, there is provided a polyester resin composition including a catalyst and an electrostatic pinning agent, wherein a metal content in the catalyst is to 150 ppm and a metal content in the electrostatic pinning agent is 10 to 50 ppm.

The polyester resin composition may further include a phosphorous compound as a heat stabilizer, wherein the phosphorous compound satisfies Equation 1 below:

$$0.5 \leq [P]/[Me] \leq 1.5 \qquad \text{[Equation 1]}$$

(in Equation 1, [P] means the equivalent of phosphorous in the phosphorous compound, and [Me] means the total equivalent of metal in a metal compound used as the pinning agent).

The electrostatic pinning agent may be any one or a mixture of two or more selected from an alkali metal compound, an alkali earth metal compound, a manganese compound, a cobalt compound, and a zinc compound.

The electrostatic pinning agent may be any one or a mixture of two or more selected from magnesium acetate, sodium acetate, calcium acetate, lithium acetate, calcium phosphate, magnesium oxide, magnesium hydroxide, magnesium alkoxide, manganese acetate, and zinc acetate.

The catalyst may be any one or a mixture of two or more selected from an antimony compound, a tin compound, a titanium compound, and a germanium compound.

The polyester resin composition may further include any one or two or more additives selected from an auxiliary flame retardant, a pigment, a dye, a glass fiber, a filler, a heat-resistant agent, an impact aid, a fluorescent whitening agent, and a color improver.

The polyester resin composition may further include an inorganic particle.

The inorganic particle may be coated with a metal compound.

Here, the number of defects of which a major-axis length is 1.5 μm or larger in an area of 448 μm×336 μm may be 4 or less.

Here, a melt resistance may be 2 to 8MΩ and a resin color (b value) may be 4.0 or less.

In another general aspect, there is provided a polyester film manufactured by melt-extruding and stretching the polyester resin composition as described above.

Advantageous Effects

According to the present invention, the polyester resin composition allows the manufacture of a film having a reduced number of internal defects and low haze at the time of film manufacture by controlling the content of metal component. Further, according to the present invention, drivability at the time of film manufacture is stable, and thus, the film manufacture is practicable.

BEST MODE

Hereinafter, the present invention will be described in more detail with reference to aspects thereof.

The present invention is directed to a polyester resin composition for an optical film having reduced internal defects and an optical film using the same.

The present inventors reviewed factors acting as the internal defects at the time of manufacturing a polyester optical film, and as the result, it could be found that the internal defects were caused by using a catalyst and an electrostatic pinning agent at the time of polyester resin polymerization. Also, it was found that metal components contained in the catalyst and the electrostatic pinning agent are precipitated or form complexes in the resin, and thus are left in the PET after resin manufacture, and thus become defects. Also, it was found that, in the case where the content of the electrostatic pinning agent is excessively reduced in order to solve the forgoing problem, the pinning property in the film manufacturing process is affected, which may lead to deterioration in drivability and processability at the time of film manufacture.

Therefore, the present inventors found that there can be provided a polyester resin composition for an optical film, having reduced internal defects, by reducing the contents of the catalyst and the pinning agent within the range where the pinning property is not affected during the film manufacturing process, and completed the present invention.

In particular, it was found that, when the content of metal in a metal compound used as the catalyst is 150 ppm or less, and more specifically 50 to 150 ppm at the time of polyester resin polymerization, and the total content of metal in the alkali metal or alkali earth metal used as an electrostatic pinning agent is 50 ppm or less, and more specifically, 10 to 50 ppm at the time of polyester resin polymerization, there can be manufactured an optical film capable of solving an internal defect problem as well as a drivability problem and having low haze.

In addition, the present invention, as necessary, may further include a phosphorous compound in order to impart heat stability. Here, since phosphorous (P) contained in the phosphorous compound is also a metal component, the addition of the phosphorous compound within the range satisfying Equation 1 below allows the manufacture of an optical film capable of solving an internal defect problem as well as a drivability problem and having low haze:

$$0.5 \le [P]/[Me] \le 1.5 \quad \text{[Equation 1]}$$

(in Equation 1, [P] means the equivalent of phosphorous in the phosphorous compound, and [Me] means the total equivalent of metal in the metal compound used as a pinning agent).

In Equation 1 above, the equivalent means the number of moles of an ion included in the metal atoms. Also, it is expressed by the product of the number of moles of a metal atom in the metal compound, which is fed in PET resin, and the number of ions included in the metal atom. That is, the equivalent of metal is introduced by Equations 2 to 4 below.

$$\text{Atom content} = \text{feeding amount} \times \text{atomic weight/molecular weight} \quad \text{(Equation 2)}$$

$$\text{Number of moles of atom} = \text{atom content/atomic weight} \quad \text{(Equation 3)}$$

$$\text{Equivalent of metal atom} = \text{number of moles of metal atom} \times \text{number of ions included in metal atom} \quad \text{(Equation 4).}$$

Ex.) Equivalent of [Mg]=number of moles of [Mg] fed×2 (+)

Equivalent of [P]=number of moles of [P] fed×3(+)

The resin composition of the present invention includes all of the melted materials and pellet type compositions before or after synthesizing the polyester resin.

Hereinafter, respective constitutions of the present invention will be described in more detail.

An aspect of the present invention is directed to a polyester resin composition including a catalyst and an electrostatic pinning agent, while a metal content in the catalyst is 50 to 150 ppm and a metal content in an electrostatic pinning agent is 10 to 50 ppm.

Another aspect of the present invention is directed to a polyester resin composition including a catalyst and an electrostatic pinning agent, while a metal content in the catalyst is 50 to 150 ppm and a metal content in an electrostatic pinning agent is 10 to 50 ppm, and further including a phosphorous compound within the range satisfying Equation 1 below:

$$0.5 \le [P]/[Me] \le 1.5 \quad \text{[Equation 1]}$$

(in Equation 1, [P] means the equivalent of phosphorous in the phosphorous compound, and [Me] means the total equivalent of metal in the metal compound used as a pinning agent).

The foregoing composition is for manufacturing a polyester film. In the case where the foregoing composition is used to manufacture the polyester film, mechanical characteristics and thermal characteristics of polyester itself are intactly maintained and flame-retardant performance and electrostatic pinning performance are excellent, thereby solving the problem that a large number of defective products are produced due to internal defects at the time of film manufacture.

The polyester may be a conventional polyester homopolymer or polyester copolymer that may be prepared by an esterification or transesterification reaction, for example, melting polycondensation of dicarboxylic acid or an ester derivative thereof and diol or an ester derivative thereof.

Examples of the dicarboxylic acid or the ester derivative thereof may be terephthalic acid, 2,6-naphthalene dicarboxylic acid, isophthalic acid, phthalic acid, 5-sodium sulfone isophthalic acid, 1,4-cyclohexane dicarboxylic acid, 1,3-cyclohexane dicarboxylic acid, or an ester derivative thereof.

The diol or the ester derivative thereof may be any one or a mixture of at least two selected from the group consisting of ethylene glycol, 1,3-propanediol, 1,4-butanediol, 1,6-hexanediol, neopentyl glycol, 1,4-cyclohexanedimethanol, bisphenol A, and bisphenol S.

In the present invention, any catalyst that can be used at the time of polyester polymerization may be used without limitation. More preferably, a metal catalyst, such as tin, antimony, or the like, may be used, and specifically, an antimony compound, a tin compound, a titanium compound, a germanium compound, or the like, may be used. Here, the metal content in the catalyst is preferably 150 ppm or less, and more specifically, 50 to 150 ppm, in the polyester resin composition. If the metal content in the catalyst is below 50 ppm, effects due to the use of the catalyst is insignificant, and thus, the time period for polymerization reaction becomes long, and molecular weight, viscosity, and requested chemical/physical properties of the polymer are difficult to obtain. If the metal content in the catalyst is above 150 ppm, the metal is precipitated or forms complexes in the resin due to excessive quantity of metal, resulting in internal defects.

In the present invention, any electrostatic pinning agent that can be usually used may be used without limitation, but more preferably, a metal based pinning agent may be used, and more specifically, an alkali metal compound, an alkali earth metal compound, a manganese compound, a cobalt compound, a zinc compound, or the like may be used due to great electrostatic activity thereof. Specific examples thereof may be magnesium acetate, sodium acetate, calcium acetate, lithium acetate, calcium phosphate, magnesium oxide, magnesium hydroxide, magnesium alkoxide, manganese acetate, zinc acetate, or the like, and one or two or more thereof may be mixingly used. In the case where two or more thereof are used mixing therewith, the total content of metal is preferably 50 ppm or less in the polyester resin composition.

When the total content of metal in the electrostatic pinning agent is 50 ppm or less, and more specifically 10 to 50 ppm, in the polyester resin composition, there can be manufactured an optical film capable of solving an internal defect problem as well as a drivability problem and having low haze. If the metal content in the electrostatic pinning agent is below 10 ppm, drivability cannot be improved due to the use of the pinning agent, and thus drivability and processability may be deteriorated at the time of film manufacture, resulting in defects. If the metal content in the electrostatic pinning agent is above 50 ppm, agglomeration occurs or complexes are formed due to excessive quantity of metal, which may cause internal defects.

The present invention, as necessary, may further include a phosphorous compound in order to impart heat stability. Specific examples of the phosphorous compound may be trimethyl phosphate, triethyl phosphate, phosphoric acid, or the like. The phosphorous compound may impart an effect of improving pinning property in addition to the heat stability effect. Here, since phosphorous (P) contained in the phosphorous compound is also a metal component, in the case of adding the phosphorous compound, the phosphorous (P) is preferably 50 ppm or less, and more specifically 10 to 50 ppm, in the polyester resin composition. More preferably, within the range satisfying Equation 1 below, there can be manufactured an optical film capable of solving an internal defect problem as well as a drivability problem and having low haze:

$$0.5 \leq [P]/[Me] \leq 1.5 \quad \text{[Equation 1]}$$

(in Equation 1, [P] means the equivalent of phosphorous in the phosphorous compound, and [Me] means the total equivalent of metal in the metal compound used as a pinning agent).

Equation 1 above expresses an equivalent ratio between an ion derived from phosphorous and an ion derived from metal. Since it is normal that the current applied to a casting drum exhibits a negative (−) current, the polyester resin composition preferably exhibits a positive (+) current in order to impart the pinning property. In order to achieve this, the forgoing metal compound having a positive (+) charge is added. In the case where the non-conductive phosphorous compound is added, it is preferable to control the equivalent ratio, to thereby maintain conductivity (specific resistivity) and pinning property of the polymer. In particular, within the above range, there can be manufactured an optical film having excellent drivability, less internal defects, and low haze.

In addition, the composition of the present invention may further include any one or two or more additives selected from the group consisting of an auxiliary flame retardant, a pigment, a dye, a reinforcing agent such as a glass fiber or the like, a filler, a heat-resistant agent, an impact aid, a fluorescent whitening agent for improving chromaticity, and a germanium compound containing germanium oxide.

In addition, in order to impart antiblocking characteristics required at the time of film manufacture, several particles may be used to lower surface frictional force, and inorganic particles may be used as the forgoing particles. Any inorganic particle that can be conventionally used in this field may be used without limitation. Specifically, for example, the surface frictional force can be lowered by $SiO_2$ particles. However, in the case where transparency of products is important, it is preferable to use $BaSO_4$ particles having a refractive index similar to that of a polyester resin. More preferably, since affinity between $BaSO_4$ and a polyester resin is low, it is preferable to coat surfaces of $BaSO_4$ or $SiO_2$ particles with a metal compound having high affinity with the polyester resin, so that excellent transparency can be obtained. As the metal compound, aluminum oxide or the like may be used, but is not limited thereto. The metal compound is coated on the particles in preferably 0.2 to 10 wt % based on the content of particles.

In the present invention, the electrostatic pinning agent and the phosphorous compound may be added at the time of polyester resin polymerization. More specifically, the polyester resin composition may be prepared by including: mixing the dicarboxylic acid or the ester derivative thereof and the diol or the ester derivative thereof to thereby prepare a slurry, and advancing a direct esterification reaction to prepare a low molecular material (low molecular weight oligomer); and adding the electrostatic pinning agent and the phosphorous compound to the low molecular material, followed by the addition of further additives, and performing a polycondensation reaction.

The polyester resin prepared by the manufacturing method according to the present invention satisfies the following properties: melt resistivity is 2 to 8MΩ; the color coordinate b value is 4 or smaller; and the number of defects having a size of 1.5 μm or larger in an area of 448 μm×336 μm is 4 or less. Within the range satisfying the above properties, the polyester resin is suitably used as an optical film.

Here, if the melt resistivity is below 2 MΩ, film drivability and processability may be improved, but internal defects may be generated due to an excessive quantity of metal in the electrostatic pinning agent. If the melt resistivity is above 8 MΩ, film drivability and processability are deteriorated, which may cause surface scratches and defective external appearance.

In addition, if the color coordinate b value of the polyester resin is above 4, the film color is affected and thereby the polyester resin is not suitable for an optical film requiring transparency, and the color of the film surface and the color of the roll side of the film are changed and thereby the external appearance may be defective. Therefore, the color coordinate b value is preferably 4 or less, and more specifically 1 to 4.

In addition, if the number of defects having a size of 1.5 µm or larger in an area of 448 µm×336 µm is large, reflection and scattering of light and the like may occur in the film surface, which may cause deterioration in transparency of the film. Moreover, defects of 1.5 µm or larger may be transferred to a base layer or a coating layer at the time of coating an optical film, and thus may cause the final products to be defective. The size of the defect means the length in a major axis thereof when the defect is observed through a microscope. The polyester resin according to the present invention can satisfy the property that the number of defects having a size of 1.5 µm or larger in an area of 448 µm×336 µm is 4 or less, and more specifically, 0 to 4.

In addition, in the polyester film according to the present invention, the haze thereof may be within the range of 0.5% or less, and more specifically 0.2 to 0.5.

In the present invention, the polyester film may be manufactured by the conventional method, for example, the foregoing polyester resin composition is melt-extruded by the conventionally known T-die method, to obtain a non-stretched sheet; the obtained non-stretched sheet is stretched by 2 to 7 times, preferably 3 to 5 times in a machine direction, and then stretched by 2 to 7 times, preferably 3 to 5 times in a traverse direction.

Hereinafter, the present invention will be in detail described by examples, but the present invention is not limited to the following examples.

Hereinafter, properties were measured by the following measurement methods.

1) Number of Internal Defects

For the method for measuring internal defects, a polyester resin composition chip manufactured in a pellet type is melted on a slide glass, to form a 500 µm-thick sample. An optical microscope is used to observe defects in a layer at a depth of 180 µm by using a transmission light at a magnification of 200 times. The number of defects having a size of 1.5 µm or larger in an area of 448 µm×336 µm is calculated by averaging the number of defects for total 5 sheets of microscopic images. In addition, the size of the defect may be measured by a scale bar of a microscope, and is based on a major axis of the defect.

2) Melt Resistance

For the experiment for measuring pinning property, a sample is prepared by placing 0.5 g of a polyester resin composition chip in a groove (1.5 cm×1.5 cm) at the center of a frame formed of Teflon and connecting aluminum electrodes (foils), of which both ends are spaced at a predetermined distance, to upper and lower portions of the chip. The sample is melted at 285° C. for 5 minutes and then subjected to application of a pressure of 0.7 to 1.0 mPa, and then an electric resistance value after 13 minutes is measured.

When the melt resistance is 2 to 8 (MΩ), the sample may be applied to a film manufacturing process.

3) Haze

By using a Pilot film manufacturing machine, a polyester resin was melted through a T-die for an extruder and cooled by a casting drum, to thereby manufacture a 1690 µm thick sheet. The manufactured sheet is stretched by times in machine and traverse directions, and manufactured into a sheet of 188 µm, and then the haze thereof was measured.

The haze was measured according to the ASTM D-1003. Seven portions of the film were extracted from two sections of a side part and one section of a central part of the film, and then each of the portions was cut into a 5 cm×5 cm-sized slice. Each slice was put into a haze measurement machine (Nihon Denshoku Corporation, NDH 300A) and 555 nm wavelength of light was made to transmit therethrough. The haze was calculated by the following equation, and then an average value excluding the maximum value and the minimum value was produced.

Haze (%)=(total scattering light/total transmitting light)×100

4) Resin Color

As the resin color, the b value of the manufactured flame retardant polyester polymer was measured by using a color coordination system (Nippon Denshoku Corporation, Model No. SE-2000).

5) Inherent Viscosity Measurement Method 0.4 g of a PET pallet (sample) was put into 100 ml of an orthochlorophenol reagent, and was dissolved for 100 minutes. After that, this was transferred in an Ubbelohde viscometer, which was maintained in a thermostat at 30° C. for 10 minutes, and the fall time of a solution was obtained by using a viscometer and an aspirator. Also, the fall time of a solvent was obtained by the same method, and then an R.V. value and an I.V. value were calculated by Equations 1 and 2 below.

$$R.V.=\text{fall time of sample/fall time of solvent} \qquad \text{[Equation 1]}$$

$$I.V.=\tfrac{1}{4}(R.V.-1)/C+\tfrac{3}{4}(\ln R.V./C) \qquad \text{[Equation 2]}$$

Example 1

Terephthalic acid 1730 kg (10.42 kmole) and ethylene glycol 775 kg (12.5 kmole) were fed into an esterification reactor, and then subjected to an esterification reaction under the conditions of a pressure of 1.5 kg/cm² and a temperature of 255° C. for 4 hours, to prepare a prepolymer bis-β-hydroxyethyl terephthalate (BHET). Water generated during the reaction was separated through a distillation tower, and ethylene glycol additionally generated after completion of the esterification reaction was also separated through the distillation tower.

Based on 1.8 ton of the resin composition, magnesium acetate of 0.16 kg (Mg content per 100 parts by weight of polyester resin composition: 10 ppm) was added to the prepared BHET, and as a catalyst, antimony trioxide 0.108 kg (Sb content per 100 parts by weight of polyester resin composition: 50 ppm) was added thereto. The polycondensation reaction was advanced under high vacuum of 0.3 torr for 4 hours while the temperature was gently raised from 240° C. to 285° C., to prepare a polyethylene terephthalate resin having inherent viscosity (IV) of 0.650.

Properties of the prepared polyethylene terephthalate resin were measured, and the measured results were tabulated in Table 1.

Example 2

Terephthalic acid 1730 kg (10.42 kmole) and ethylene glycol 775 kg (12.5 kmole) were fed into an esterification reactor, and then subjected to an esterification reaction under the conditions of a pressure of 1.5 kg/cm² and a temperature of 255° C. for 4 hours, to prepare a prepolymer bis-β-hydroxyethyl terephthalate (BHET). Water generated during the reaction was separated through a distillation tower, and ethylene glycol additionally generated after completion of the esterification reaction was also separated through the distillation tower.

Based on 1.8 ton of the resin composition, magnesium acetate of 0.48 kg (Mg content per 100 parts by weight of polyester resin composition: 30 ppm) was added to the prepared BHET, and as a catalyst, antimony trioxide 0.108 kg (Sb content per 100 parts by weight of polyester resin composition: 50 ppm) was added thereto. The polycondensation reaction was advanced under high vacuum of 0.3 torr for 4 hours while the temperature was gently raised from 240° C. to 285° C., to prepare a polyethylene terephthalate resin having inherent viscosity (IV) of 0.650.

Properties of the prepared polyethylene terephthalate resin were measured, and the measured results were tabulated in Table 1.

Example 3

Terephthalic acid 1730 kg (10.42 kmole) and ethylene glycol 775 kg (12.5 kmole) were fed into an esterification reactor, and then subjected to an esterification reaction under the conditions of a pressure of 1.5 kg/cm² and a temperature of 255° C. for 4 hours, to prepare a prepolymer bis-β-hydroxyethyl terephthalate (BHET). Water generated during the reaction was separated through a distillation tower, and ethylene glycol additionally generated after completion of the esterification reaction was also separated through the distillation tower.

Based on 1.8 ton of the resin composition, magnesium acetate of 0.79 kg (Mg content per 100 parts by weight of polyester resin composition: 50 ppm) was added to the prepared BHET, and as a catalyst, antimony trioxide 0.108 kg (Sb content per 100 parts by weight of polyester resin composition: 50 ppm) was added thereto. The polycondensation reaction was advanced under high vacuum of 0.3 torr for 4 hours while the temperature was gently raised from 240° C. to 285° C., to prepare a polyethylene terephthalate resin having inherent viscosity (IV) of 0.650.

Properties of the prepared polyethylene terephthalate resin were measured, and the measured results were tabulated in Table 1.

Example 4

Terephthalic acid 1730 kg (10.42 kmole) and ethylene glycol 775 kg (12.5 kmole) were fed into an esterification reactor, and then subjected to an esterification reaction under the conditions of a pressure of 1.5 kg/cm² and a temperature of 255° C. for 4 hours, to prepare a prepolymer bis-β-hydroxyethyl terephthalate (BHET). Water generated during the reaction was separated through a distillation tower, and ethylene glycol additionally generated after completion of the esterification reaction was also separated through the distillation tower.

Based on 1.8 ton of the resin composition, magnesium acetate of 0.16 kg (Mg content per 100 parts by weight of polyester resin composition: 10 ppm) was added to the prepared BHET, and as a catalyst, antimony trioxide 0.216 kg (Sb content per 100 parts by weight of polyester resin composition: 100 ppm) was added thereto. The polycondensation reaction was advanced under high vacuum of 0.3 torr for 4 hours while the temperature was gently raised from 240° C. to 285° C., to prepare a polyethylene terephthalate resin having inherent viscosity (IV) of 0.650.

Example 5

Terephthalic acid 1730 kg (10.42 kmole) and ethylene glycol 775 kg (12.5 kmole) were fed into an esterification reactor, and then subjected to an esterification reaction under the conditions of a pressure of 1.5 kg/cm² and a temperature of 255° C. for 4 hours, to prepare a prepolymer bis-β-hydroxyethyl terephthalate (BHET). Water generated during the reaction was separated through a distillation tower, and ethylene glycol additionally generated after completion of the esterification reaction was also separated through the distillation tower.

Based on 1.8 ton of the resin composition, magnesium acetate of 0.48 kg (Mg content per 100 parts by weight of polyester resin composition: 30 ppm) was added to the prepared BHET, and as a catalyst, antimony trioxide 0.216 kg (Sb content per 100 parts by weight of polyester resin composition: 100 ppm) was added thereto. The polycondensation reaction was advanced under high vacuum of 0.3 torr for 4 hours while the temperature was gently raised from 240° C. to 285° C., to prepare a polyethylene terephthalate resin having inherent viscosity (IV) of 0.650.

Example 6

Terephthalic acid 1730 kg (10.42 kmole) and ethylene glycol 775 kg (12.5 kmole) were fed into an esterification reactor, and then subjected to an esterification reaction under the conditions of a pressure of 1.5 kg/cm² and a temperature of 255° C. for 4 hours, to prepare a prepolymer bis-β-hydroxyethyl terephthalate (BHET). Water generated during the reaction was separated through a distillation tower, and ethylene glycol additionally generated after completion of the esterification reaction was also separated through the distillation tower.

Based on 1.8 ton of the resin composition, magnesium acetate of 0.79 kg (Mg content per 100 parts by weight of polyester resin composition: 50 ppm) was added to the prepared BHET, and as a catalyst, antimony trioxide 0.216 kg (Sb content per 100 parts by weight of polyester resin composition: 100 ppm) was added thereto. The polycondensation reaction was advanced under high vacuum of 0.3 torr for 4 hours while the temperature was gently raised from 240° C. to 285° C., to prepare a polyethylene terephthalate resin having inherent viscosity (IV) of 0.650.

Example 7

Terephthalic acid 1730 kg (10.42 kmole) and ethylene glycol 775 kg (12.5 kmole) were fed into an esterification reactor, and then subjected to an esterification reaction under the conditions of a pressure of 1.5 kg/cm² and a temperature of 255° C. for 4 hours, to prepare a prepolymer bis-β-hydroxyethyl terephthalate (BHET). Water generated during the reaction was separated through a distillation tower, and ethylene glycol additionally generated after completion of the esterification reaction was also separated through the distillation tower.

Based on 1.8 ton of the resin composition, magnesium acetate of 0.16 kg (Mg content per 100 parts by weight of polyester resin composition: 10 ppm) was added to the prepared BHET, and as a catalyst, antimony trioxide 0.32 kg (Sb content per 100 parts by weight of polyester resin composition: 150 ppm) was added thereto. The polycondensation reaction was advanced under high vacuum of 0.3 torr for 4 hours while the temperature was gently raised from 240° C. to 285° C., to prepare a polyethylene terephthalate resin having inherent viscosity (IV) of 0.650.

Example 8

Terephthalic acid 1730 kg (10.42 kmole) and ethylene glycol 775 kg (12.5 kmole) were fed into an esterification reactor, and then subjected to an esterification reaction under the conditions of a pressure of 1.5 kg/cm² and a temperature of 255° C. for 4 hours, to prepare a prepolymer bis-β-hydroxyethyl terephthalate (BHET). Water generated during the reaction was separated through a distillation tower, and ethylene glycol additionally generated after completion of the esterification reaction was also separated through the distillation tower.

Based on 1.8 ton of the resin composition, magnesium acetate of 0.48 kg (Mg content per 100 parts by weight of polyester resin composition: 30 ppm) was added to the prepared BHET, and as a catalyst, antimony trioxide 0.32 kg (Sb content per 100 parts by weight of polyester resin composition: 150 ppm) was added thereto. The polycondensation reaction was advanced under high vacuum of 0.3 torr for 4 hours while the temperature was gently raised from 240° C. to 285° C., to prepare a polyethylene terephthalate resin having inherent viscosity (IV) of 0.650.

Example 9

Terephthalic acid 1730 kg (10.42 kmole) and ethylene glycol 775 kg (12.5 kmole) were fed into an esterification reactor, and then subjected to an esterification reaction under the conditions of a pressure of 1.5 kg/cm² and a temperature of 255° C. for 4 hours, to prepare a prepolymer bis-β-hydroxyethyl terephthalate (BHET). Water generated during the reaction was separated through a distillation tower, and ethylene glycol additionally generated after completion of the esterification reaction was also separated through the distillation tower.

Based on 1.8 ton of the resin composition, magnesium acetate of 0.79 kg (Mg content per 100 parts by weight of polyester resin composition: 50 ppm) was added to the prepared BHET, and as a catalyst, antimony trioxide 0.32 kg (Sb content per 100 parts by weight of polyester resin composition: 150 ppm) was added thereto. The polycondensation reaction was advanced under high vacuum of 0.3 torr for 4 hours while the temperature was gently raised from 240° C. to 285° C., to prepare a polyethylene terephthalate resin having inherent viscosity (IV) of 0.650.

Example 10

Terephthalic acid 1730 kg (10.42 kmole) and ethylene glycol 775 kg (12.5 kmole) were fed into an esterification reactor, and then subjected to an esterification reaction under the conditions of a pressure of 1.5 kg/cm² and a temperature of 255° C. for 4 hours, to prepare a prepolymer bis-β-hydroxyethyl terephthalate (BHET). Water generated during the reaction was separated through a distillation tower, and ethylene glycol additionally generated after completion of the esterification reaction was also separated through the distillation tower.

Based on 1.8 ton of the resin composition, magnesium acetate of 0.48 kg (Mg content per 100 parts by weight of polyester resin composition: 30 ppm) was added to the prepared BHET. Then, as a catalyst, antimony trioxide 0.216 kg (Sb content per 100 parts by weight of polyester resin composition: 100 ppm) was added thereto, and as a heat stabilizer, trimethylphosphate 0.16 kg (P content per 100 parts by weight of polyester resin composition: 20 ppm) was added thereto. The polycondensation reaction was advanced under high vacuum of 0.3 torr for 4 hours while the temperature was gently raised from 240° C. to 285° C., to prepare a polyethylene terephthalate resin having inherent viscosity (IV) of 0.650.

Example 11

Terephthalic acid 1730 kg (10.42 kmole) and ethylene glycol 775 kg (12.5 kmole) were fed into an esterification reactor, and then subjected to an esterification reaction under the conditions of a pressure of 1.5 kg/cm² and a temperature of 255° C. for 4 hours, to prepare a prepolymer bis-β-hydroxyethyl terephthalate (BHET). Water generated during the reaction was separated through a distillation tower, and ethylene glycol additionally generated after completion of the esterification reaction was also separated through the distillation tower.

Based on 1.8 ton of the resin composition, magnesium acetate of 0.36 kg (Mg content per 100 parts by weight of polyester resin composition: 23 ppm) was added to the prepared BHET. Then, as a catalyst, antimony trioxide 0.216 kg (Sb content per 100 parts by weight of polyester resin composition: 100 ppm) was added thereto, and as a heat stabilizer, trimethylphosphate 0.16 kg (P content per 100 parts by weight of polyester resin composition: 20 ppm) was added thereto. The polycondensation reaction was advanced under high vacuum of 0.3 torr for 4 hours while the temperature was gently raised from 240° C. to 285° C., to prepare a polyethylene terephthalate resin having inherent viscosity (IV) of 0.650.

Example 12

Terephthalic acid 1730 kg (10.42 kmole) and ethylene glycol 775 kg (12.5 kmole) were fed into an esterification reactor, and then subjected to an esterification reaction under the conditions of a pressure of 1.5 kg/cm² and a temperature of 255° C. for 4 hours, to prepare a prepolymer bis-β-hydroxyethyl terephthalate (BHET). Water generated during the reaction was separated through a distillation tower, and ethylene glycol additionally generated after completion of the esterification reaction was also separated through the distillation tower.

Based on 1.8 ton of the resin composition, magnesium acetate of 0.36 kg (Mg content per 100 parts by weight of polyester resin composition: 23 ppm) was added to the prepared BHET and sodium acetate of 0.02 kg (Na content per 100 parts by weight of polyester resin composition: 2 ppm) was added thereto. Then, as a catalyst, antimony trioxide 0.216 kg (Sb content per 100 parts by weight of polyester resin composition: 100 ppm) was added thereto, and as a heat stabilizer, trimethylphosphate of 0.16 kg (P content per 100 parts by weight of polyester resin composition: 20 ppm) was added thereto. The polycondensation reaction was advanced under high vacuum of 0.3 torr for 4 hours while the temperature was gently raised from 240° C. to 285° C., to prepare a polyethylene terephthalate resin having inherent viscosity (IV) of 0.650.

Example 13

Terephthalic acid 1730 kg (10.42 kmole) and ethylene glycol 775 kg (12.5 kmole) were fed into an esterification reactor, and then subjected to an esterification reaction under the conditions of a pressure of 1.5 kg/cm² and a temperature of 255° C. for 4 hours, to prepare a prepolymer bis-β-hydroxyethyl terephthalate (BHET). Water generated during the reaction was separated through a distillation tower, and ethylene glycol additionally generated after completion of the esterification reaction was also separated through the distillation tower.

Based on 1.8 ton of the resin composition, magnesium acetate of 0.27 kg (Mg content per 100 parts by weight of polyester resin composition: 17 ppm) was added to the prepared BHET and sodium acetate of 0.02 kg (Na content per 100 parts by weight of polyester resin composition: 2 ppm) was added thereto. Then, as a catalyst, antimony trioxide 0.216 kg (Sb content per 100 parts by weight of polyester resin composition: 100 ppm) was added thereto, and as a heat stabilizer, trimethylphosphate of 0.18 kg (P content per 100 parts by weight of polyester resin composition: 22 ppm) was added thereto. The polycondensation reaction was advanced under high vacuum of 0.3 torr for 4 hours while the temperature was gently raised from 240° C. to 285° C., to prepare a polyethylene terephthalate resin having inherent viscosity (IV) of 0.650.

Example 14

Terephthalic acid 1730 kg (10.42 kmole) and ethylene glycol 775 kg (12.5 kmole) were fed into an esterification reactor, and then subjected to an esterification reaction under the conditions of a pressure of 1.5 kg/cm² and a temperature of 255° C. for 4 hours, to prepare a prepolymer bis-β-hydroxyethyl terephthalate (BHET). Water generated during the reaction was separated through a distillation tower, and ethylene glycol additionally generated after completion of the esterification reaction was also separated through the distillation tower.

Based on 1.8 ton of the resin composition, magnesium acetate of 0.37 kg (Mg content per 100 parts by weight of polyester resin composition: 23 ppm) was added to the prepared BHET. Then, as a catalyst, antimony trioxide 0.216 kg (Sb content per 100 parts by weight of polyester resin composition: 100 ppm) was added thereto, and as a heat stabilizer, trimethylphosphate of 0.08 kg (P content per 100 parts by weight of polyester resin composition: 10 ppm) was added thereto. The polycondensation reaction was advanced under high vacuum of 0.3 torr for 4 hours while the temperature was gently raised from 240° C. to 285° C., to prepare a polyethylene terephthalate resin having inherent viscosity (IV) of 0.650.

Example 15

Terephthalic acid 1730 kg (10.42 kmole) and ethylene glycol 775 kg (12.5 kmole) were fed into an esterification reactor, and then subjected to an esterification reaction under the conditions of a pressure of 1.5 kg/cm² and a temperature of 255° C. for 4 hours, to prepare a prepolymer bis-β-hydroxyethyl terephthalate (BHET). Water generated during the reaction was separated through a distillation tower, and ethylene glycol additionally generated after completion of the esterification reaction was also separated through the distillation tower.

Based on 1.8 ton of the resin composition, magnesium acetate of 0.306 kg (Mg content per 100 parts by weight of polyester resin composition: 19 ppm) was added to the prepared BHET. Then, as a catalyst, antimony trioxide 0.216 kg (Sb content per 100 parts by weight of polyester resin composition: 100 ppm) was added thereto, and as a heat stabilizer, trimethylphosphate of 0.20 kg (P content per 100 parts by weight of polyester resin composition: 24 ppm) was added thereto. The polycondensation reaction was advanced under high vacuum of 0.3 torr for 4 hours while the temperature was gently raised from 240° C. to 285° C., to prepare a polyethylene terephthalate resin having inherent viscosity (IV) of 0.650.

Example 16

Terephthalic acid 1730 kg (10.42 kmole) and ethylene glycol 775 kg (12.5 kmole) were fed into an esterification reactor, and then subjected to an esterification reaction under the conditions of a pressure of 1.5 kg/cm² and a temperature of 255° C. for 4 hours, to prepare a prepolymer bis-β-hydroxyethyl terephthalate (BHET). Water generated during the reaction was separated through a distillation tower, and ethylene glycol additionally generated after completion of the esterification reaction was also separated through the distillation tower.

Based on 1.8 ton of the resin composition, magnesium acetate of 0.8 kg (Mg content per 100 parts by weight of polyester resin composition: 50 ppm) was added to the prepared BHET. Then, as a catalyst, antimony trioxide 0.216 kg (Sb content per 100 parts by weight of polyester resin composition: 100 ppm) was added thereto, and as a heat stabilizer, trimethylphosphate of 0.41 kg (P content per 100 parts by weight of polyester resin composition: 50 ppm) was added thereto. The polycondensation reaction was advanced under high vacuum of 0.3 torr for 4 hours while the temperature was gently raised from 240° C. to 285° C., to prepare a polyethylene terephthalate resin having inherent viscosity (IV) of 0.650.

Comparative Example 1

Terephthalic acid 1730 kg (10.42 kmole) and ethylene glycol 775 kg (12.5 kmole) were fed into an esterification reactor, and then subjected to an esterification reaction under the conditions of a pressure of 1.5 kg/cm² and a temperature of 255° C. for 4 hours, to prepare a prepolymer bis-β-hydroxyethyl terephthalate (BHET). Water generated during the reaction was separated through a distillation tower, and ethylene glycol additionally generated after completion of the esterification reaction was also separated through the distillation tower.

Based on 1.8 ton of the resin composition, magnesium acetate of 0.87 kg (Mg content per 100 parts by weight of polyester resin composition: 55 ppm) was added to the prepared BHET, and as a catalyst, antimony trioxide 0.35 kg (Sb content per 100 parts by weight of polyester resin composition: 160 ppm) was added thereto. The polycondensation reaction was advanced under high vacuum of 0.3 torr for 4 hours while the temperature was gently raised from 240° C. to 285° C., to prepare a polyethylene terephthalate resin having inherent viscosity (IV) of 0.650.

Comparative Example 2

Terephthalic acid 1730 kg (10.42 kmole) and ethylene glycol 775 kg (12.5 kmole) were fed into an esterification reactor, and then subjected to an esterification reaction under the conditions of a pressure of 1.5 kg/cm² and a temperature of 255° C. for 4 hours, to prepare a prepolymer bis-β-hydroxyethyl terephthalate (BHET). Water generated during the reaction was separated through a distillation tower, and ethylene glycol additionally generated after completion of the esterification reaction was also separated through the distillation tower.

Based on 1.8 ton of the resin composition, magnesium acetate of 0.14 kg (Mg content per 100 parts by weight of polyester resin composition: 9 ppm) was added to the prepared BHET, and as a catalyst, antimony trioxide 0.09 kg (Sb content per 100 parts by weight of polyester resin composition: 40 ppm) was added thereto. The polycondensation reaction was advanced under high vacuum of 0.3 torr for 4 hours while the temperature was gently raised from 240° C. to 285° C., to prepare a polyethylene terephthalate resin having inherent viscosity (IV) of 0.650.

Since the catalyst content of the resin was very less, the reaction time at the time of polymerization became long, and as a result, it was confirmed that the number of defects was increased due to thermal decomposition or the like even though the metal content in the catalyst was small, and the color value of the resin was high. Also, it can be seen that it was difficult to form films due to high melt resistance thereof.

Comparative Example 3

Terephthalic acid 1730 kg (10.42 kmole) and ethylene glycol 775 kg (12.5 kmole) were fed into an esterification reactor, and then subjected to an esterification reaction under the conditions of a pressure of 1.5 kg/cm$^2$ and a temperature of 255° C. for 4 hours, to prepare a prepolymer bis-β-hydroxyethyl terephthalate (BHET). Water generated during the reaction was separated through a distillation tower, and ethylene glycol additionally generated after completion of the esterification reaction was also separated through the distillation tower.

Based on 1.8 ton of the resin composition, magnesium acetate of 0.27 kg (Mg content per 100 parts by weight of polyester resin composition: 17 ppm) was added to the prepared BHET. Then, as a catalyst, antimony trioxide 0.216 kg (Sb content per 100 parts by weight of polyester resin composition: 100 ppm) was added thereto, and as a heat stabilizer, trimethylphosphate of 0.25 kg (P content per 100 parts by weight of polyester resin composition: 31 ppm) was added thereto. The polycondensation reaction was advanced under high vacuum of 0.3 torr for 4 hours while the temperature was gently raised from 240° C. to 285° C., to prepare a polyethylene terephthalate resin having inherent viscosity (IV) of 0.650.

As the result, the melt resistance cannot be measured and thus film formation was difficult resulting in deteriorated external appearance such as pinning scratch.

Comparative Example 4

Terephthalic acid 1730 kg (10.42 kmole) and ethylene glycol 775 kg (12.5 kmole) were fed into an esterification reactor, and then subjected to an esterification reaction under the conditions of a pressure of 1.5 kg/cm$^2$ and a temperature of 255° C. for 4 hours, to prepare a prepolymer bis-β-hydroxyethyl terephthalate (BHET). Water generated during the reaction was separated through a distillation tower, and ethylene glycol additionally generated after completion of the esterification reaction was also separated through the distillation tower.

Based on 1.8 ton of the resin composition, magnesium acetate of 0.17 kg (Mg content per 100 parts by weight of polyester resin composition: 91 ppm) was added to the prepared BHET. Then, as a catalyst, antimony trioxide 0.216 kg (Sb content per 100 parts by weight of polyester resin composition: 100 ppm) was added thereto, and a heat stabilizer, trimethylphosphate 0.27 kg (P content per 100 parts by weight of polyester resin composition: 33 ppm). The polycondensation reaction was advanced under high vacuum of 0.3 torr for 4 hours while the temperature was gently raised from 240° C. to 285° C., to prepare a polyethylene terephthalate resin having inherent viscosity (IV) of 0.650.

The pellet type polyester resin composition prepared in the examples and the comparative examples was used, and properties were measured by the forgoing property measuring method, and then the measured results were tabulated in Table 1.

TABLE 1

| | Sb content in catalyst (ppm) | Total content of metal in pinning agent (ppm) | P content (ppm) | [P]/[Me] Equivalent ratio | Melt resistance (MΩ) | Resin color (b value) | Number of defects | Haze (%) |
|---|---|---|---|---|---|---|---|---|
| Example 1 | 50 | 10 | — | — | 7.5 | 2.2 | 0.4 | 0.34 |
| Example 2 | 50 | 30 | — | — | 6.8 | 2.9 | 0.8 | 0.37 |
| Example 3 | 50 | 50 | — | — | 6.3 | 3.2 | 2.0 | 0.43 |
| Example 4 | 100 | 10 | — | — | 5.9 | 2.4 | 1.0 | 0.36 |
| Example 5 | 100 | 30 | — | — | 4.8 | 3.1 | 1.4 | 0.38 |
| Example 6 | 100 | 50 | — | — | 4.3 | 3.5 | 3.0 | 0.46 |
| Example 7 | 150 | 10 | — | — | 5.3 | 2.5 | 0.8 | 0.37 |
| Example 8 | 150 | 30 | — | — | 4.5 | 3.2 | 1.8 | 0.41 |
| Example 9 | 150 | 50 | — | — | 3.9 | 3.7 | 3.4 | 0.47 |
| Example 10 | 100 | 30 | 20 | 0.78 | 4.2 | 2.3 | 3.0 | 0.44 |
| Example 11 | 100 | 23 | 20 | 1.02 | 5.0 | 2.1 | 2.5 | 0.40 |
| Example 12 | 100 | 25 | 20 | 0.97 | 4.5 | 2.2 | 2.8 | 0.42 |
| Example 13 | 100 | 19 | 22 | 1.43 | 5.8 | 1.8 | 1.6 | 0.39 |
| Example 14 | 100 | 23 | 10 | 0.51 | 3.3 | 2.0 | 2.4 | 0.40 |
| Example 15 | 100 | 19 | 24 | 1.49 | 7.2 | 1.5 | 1.4 | 0.35 |
| Example 16 | 100 | 50 | 50 | 1.17 | 6.6 | 3.3 | 3.8 | 0.49 |
| Comparative Example 1 | 160 | 55 | — | — | 3.5 | 4.9 | 5.8 | 0.52 |
| Comparative Example 2 | 40 | 9 | — | — | 9.5 | 4.5 | 6.2 | 0.54 |
| Comparative Example 3 | 100 | 17 | 31 | 2.14 | Beyond measurement (20 or higher) | 2.4 | 1.8 | 0.45 |

TABLE 1-continued

| | Sb content in catalyst (ppm) | Total content of metal in pinning agent (ppm) | P content (ppm) | [P]/[Me] Equivalent ratio | Melt resistance (MΩ) | Resin color (b value) | Number of defects | Haze (%) |
|---|---|---|---|---|---|---|---|---|
| Comparative Example 4 | 100 | 91 | 33 | 0.43 | 1.8 | 5.3 | 8.0 | 0.58 |

(In the above table, [P] means the equivalent of phosphorous in the phosphorous compound, and [Me] means the total equivalent of metal in the metal compound used as a pinning agent).

As shown in the above table, it can be seen that in the polyester composition according to the present invention, the melt resistance satisfied the range of 2 to 8 MΩ, which is an applicable level for a casting drum; the color (b value) was excellent, 4 or less; the number of defects was 4 or less; and the haze was low, 0.5% or less.

However, it can be seen that in Comparative Example 1 where the metal content in catalyst and the metal content in pinning agent were high, the color value and the number of defects were increased, and thus, it is impossible to apply the resin composition of Comparative Example 1 to an optical film.

In addition, it can be seen that, in Comparative Example 2 where the metal content in catalyst and the metal content in pinning agent were low, polymerization reactivity by the catalyst was bad, and thus failed to realize desired chemical/physical properties of polymers such as molecular weight and the like; the melt resistance was high, and thus film formation using a casting drum was difficult; pinning scratches were formed in the surface of the manufactured film, resulting in deteriorated external appearance; and the haze was high.

In addition, it can be seen that in Comparative Example 3 where the equivalent ratios of phosphorous and metal were out of the ranges of the present invention, the melt resistance was too high to measure; film formation using a casting drum was difficult; pinning scratches were formed in the surface of the manufactured film, resulting in deteriorated external appearance; and the haze was high.

In addition, it can be seen that in Comparative Example 4 where the equivalent ratios of phosphorous and metal were out of the ranges of the present invention due to a high content of metal in the pinning agent, the melt resistance was low so that film drivability and processability using a casting drum might be improved, but the color value and the number of defects were high due to the use of an excessive amount of electrostatic pinning agent, and thus, it is impossible to apply the resin composition of Comparative Example 4 to an optical film.

The invention claimed is:

1. A polyester resin composition comprising a catalyst, an electrostatic pinning agent, and a phosphorous compound as a heat stabilizer,
wherein a metal content in the catalyst is 50 to 150 ppm per 100 parts by weight of the polyester resin composition,
wherein a metal content in the electrostatic pinning agent is 10 to 25 ppm per 100 parts by weight of the polyester resin composition, and
a content of phosphorus element in the phosphorous compound is 24 ppm or less per 100 parts by weight of the polyester resin composition,
said phosphorous compound and said electrostatic pinning agent satisfying the following Equation 1:

$$0.5 \leq [P]/[Me] \leq 1.5 \qquad \text{[Equation 1]}$$

wherein [P] means the equivalent of phosphorus in the phosphorous compound, and [Me] means the total equivalent of a metal in the electrostatic pinning agent and wherein the polyester resin composition has a melt resistance of 2 to 8 MΩ and a resin color expressed as b value of 4.0 or less.

2. The polyester resin composition of claim 1, wherein the electrostatic pinning agent is any one or a mixture of two or more selected from the group consisting of an alkali metal compound, an alkali earth metal compound, a manganese compound, a cobalt compound, and a zinc compound.

3. The polyester resin composition of claim 2, wherein the electrostatic pinning agent is any one or a mixture of two or more selected from the group consisting of magnesium acetate, sodium acetate, calcium acetate, lithium acetate, calcium phosphate, magnesium oxide, magnesium hydroxide, magnesium alkoxide, manganese acetate, and zinc acetate.

4. The polyester resin composition of claim 1, wherein the catalyst is any one or a mixture of two or more selected from the group consisting of an antimony compound, a tin compound, a titanium compound, and a germanium compound.

5. The polyester resin composition of claim 1, further comprising any one or two or more additives selected from the group consisting of an auxiliary flame retardant, a pigment, a dye, a glass fiber, a filler, a heat-resistant agent, an impact aid, a fluorescent whitening agent, and a color improver.

6. The polyester resin composition of claim 1, further comprising an inorganic particle.

7. The polyester resin composition of claim 6, wherein the inorganic particle is coated with a metal compound.

8. The polyester resin composition of claim 1, wherein the phosphorous compound and the electrostatic pinning agent satisfy Equation 1:

$$0.78 \leq [P]/[Me] \leq 1.5 \qquad \text{[Equation 1]}$$

wherein [P] and [Me] have the same meanings as defined in claim 1.

9. A polyester film manufactured by melt-extruding and stretching the polyester resin composition of claim 1.

10. A polyester film made from the polyester resin composition of claim 1, wherein the number of defects of which a major-axis length is 1.5 μm or larger in an area of 448 μm×336 μm is 4 or less.

* * * * *